United States Patent
Balliello et al.

(10) Patent No.: US 6,241,813 B1
(45) Date of Patent: Jun. 5, 2001

(54) PIGMENT GRANULATION

(75) Inventors: Paolo Balliello, Rheinfelden (CH); Horst Olaf Brücker, Rheinfelden (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/269,498

(22) PCT Filed: Oct. 10, 1997

(86) PCT No.: PCT/EP97/05603

§ 371 Date: Mar. 29, 1999

§ 102(e) Date: Mar. 29, 1999

(87) PCT Pub. No.: WO98/17729

PCT Pub. Date: Apr. 30, 1998

(30) Foreign Application Priority Data

Oct. 22, 1996 (CH) .................................................. 2580/96

(51) Int. Cl.⁷ .......................... C09B 48/00; C09B 67/20; C09B 67/08; C09B 67/10; C09B 67/12
(52) U.S. Cl. .......................... 106/493; 106/494; 106/495; 106/496; 106/497; 106/498; 106/499
(58) Field of Search ...................... 106/493, 494, 106/495, 496, 497, 498, 499, 500; 23/313 R

(56) References Cited

U.S. PATENT DOCUMENTS

| | | | |
|---|---|---|---|
| 4,055,439 | 10/1977 | Bäbler et al. | 106/288 |
| 4,116,924 | 9/1978 | Peabody | 260/40 |
| 4,134,725 | 1/1979 | Büchel et al. | 8/79 |
| 4,168,300 | 9/1979 | Peabody | 106/308 |
| 4,208,370 | 6/1980 | Häberli et al. | 264/117 |
| 4,255,375 * | 3/1981 | Macpherson et al. | 264/117 |
| 4,264,552 | 4/1981 | McMahon et al. | 264/117 |
| 4,310,483 | 1/1982 | Dörfel et al. | 264/117 |
| 4,344,766 | 8/1982 | Lahrs et al. | 8/524 |
| 4,535,151 | 8/1985 | Fournier | 534/739 |
| 4,879,380 | 11/1989 | Bantjes et al. | 540/137 |
| 5,082,498 | 1/1992 | Kurtz et al. | 106/499 |
| 5,173,116 | 12/1992 | Roth | 106/401 |
| 5,328,506 | 7/1994 | Crumbley et al. | 106/416 |
| 5,455,288 | 10/1995 | Needham | 523/205 |

FOREIGN PATENT DOCUMENTS

| | | |
|---|---|---|
| 1027710 | 3/1978 | (CA) . |
| 216590 | 8/1984 | (CS) . |
| 3327562 | 2/1985 | (DE) . |
| 0403917 | 12/1990 | (EP) . |
| 0510392 | 10/1992 | (EP) . |
| 0670352 | 9/1995 | (EP) . |
| 2352582 | 12/1977 | (FR) . |
| 2405983 | 5/1979 | (FR) . |
| 156867 | 10/1981 | (IN) . |
| 91/06607 | 5/1991 | (WO) . |

OTHER PUBLICATIONS

Chemical Abstr. 102(8):63590n for CS 216590.
Chem. Abstr. 105(26):228604x for IN 156867.
Derwent Abstr. 85–038989/07 for DE 3327562.
Abstract for EP 0424896 May 1991.
Ries, Aufbereitungs–Technik, vol. 12, (1975).
Nishii et al., Powder Technology, vol. 74, pp. 1–6, (1993).
Mortensen et al., Chemie–Technik, vol. 21, No. 6, pp. 72–77 (1992).
Scaefer et al., Arch. Pharm. Chemi. Sci. Ed., pp. 189–201, (1978).
Iyer et al., Powder Technology, vol. 57, pp. 127–133, (1989).
Journal of Powder and Bulk Solids Technology, vol. 4, No. 4, pp. 27–32, (1980).
Derwent Abstr. 1995–303557 for EP 670352 Sep. 1995.

* cited by examiner

Primary Examiner—Mark L. Bell
Assistant Examiner—Michael J. DiVerdi
(74) Attorney, Agent, or Firm—David R. Crichton

(57) ABSTRACT

The invention relates to a process for preparing organic pigment granules with a particular particle size wherein an organic pigment with a particle size of 0.01 to 10 $\mu$m is mixed with water, a $C_1$–$C_4$alcohol, a $C_3$–$C_8$ketone or a mixture thereof, a binder and ammonia or a $C_1$–$C_3$amine and an emulsifier. This mixture is pressed in a continuously operating apparatus through one or more apertures each having a size of 0.2–5.0 mm², the apparatus consisting of at least one conveying device and a shaping section comprising the apertures, and being constructed, and operated with a throughput, such that the pressure in its shaping section does not exceed 10 bar. The granulated product is then dried at a temperature of –50 to 200° C. at atmospheric pressure or under reduced pressure. The invention also relates to pigment granules prepared by the process of the invention, with a particle size of 0.5 to 4 mm, wherein the pigment present essentially has a particle size from 0.01 to 10$\mu$m.

23 Claims, No Drawings

PIGMENT GRANULATION

The invention relates to a novel process for granulating organic colour pigments in the presence of aqueous or alcoholic media at low pressure, and to the dust-free pigment granules which can be prepared by this process.

BACKGROUND

Organic pigments consist of very fine particles, of low solubility in customary solvents, whose dimensions can lie within the range from submicroscopic to about 100 μm. For practical use, organic pigments having approximate particle sizes of from 0.01 to 0.1 μm for transparent forms and from 0.1 to 10 μm for opacifying forms have proved most suitable.

The physical properties of the pigment particles are very important to their use. For instance, very small particles possess an often relatively low light fastness and fastness to weathering and a strong propensity to agglomeration. Very coarse particles, on the other hand, give rise to undesirably low colour intensities and duller shades. In the case of the physical properties, however, particle size distribution and agglomeration play a key part, especially with respect to the dispersibility of the pigments [cf. Farbe und Lack 82/1, 7–14 (1976)].

It is therefore of critical importance for pigments to have a very narrow particle size distribution, which can usually be achieved by reprecipitation, recrystallization or heat treatment in a polar solvent, at atmospheric or superatmospheric pressure or under a high shear force (U.S. Pat. No. 4,879, 380). However, all such pigments, irrespective of the narrow particle size distribution, still have the great disadvantage of producing dust. Consequently, when they are used, expensive measures (for example of a workplace safety, ecological or quality assurance nature) are necessary and valuable material is lost.

A very large number of methods have therefore already been investigated for converting the pigments into a low-dust or even dust-free form. It has however been found that improvements in the dusting behaviour can be obtained in the case of the known methods only, among other disadvantages, at the expense of the physical properties of the pigment particles, and especially at the expense of the dispersibility. Consequently, the known methods described below are unable to satisfy fully the long-held wish for dust-free organic pigments which continue to have good physical properties.

Known compacting methods, such as compression moulding (tableting or briquetting), granulation in mix granulators and granulating discs (Aufbereitungs-Technik 12 (1975)) and in formers (Chem.-Ing.-Tech. 49/5, 374–380 (1977)), roll granulation (DE-A 27 23 221) or pressure granulation (Powder Technology 74, 1–6 (1993)) always lead, with pure organic pigments, to highly agglomerated products having performance properties worse than those of the powder. A common feature of these methods is that the pigment particles collide with one another with a relatively high force.

Pigments for use in plastics can be incorporated into polymer concentrates. The pigment is employed as a dry, dusting powder. In this context, high shear forces and temperatures are required to disperse the pigment particles thoroughly, and the physical properties and colour properties are changed. The resulting polymer grains must in turn be mixed intimately with uncoloured polymer grains for the end use, again under high shear force, since it is necessary to effect homogeneous distribution of the pigment particles together with the completely surrounding polymer. Moreover, the concentrate polymer must be compatible with the other polymer, which is why, for a single pigment, a range of two or more products is required for different plastics applications.

Pigments can also be applied to the surface of externally softened polymer granules to give spherical particles (U.S. Pat. No. 4,310,483). However, the size of such particles is difficult to control, and the fraction having the desired diameter has to be isolated by sieving. It is said that the granulating auxiliary can be used in amounts of 2–50% by weight (preferably 5–30% by weight), although it has been found that good dispersibility can only be achieved with amounts of at least 15–20% by weight. An additive which can be used in addition to the polymer granules is a wax-like binder whose melting point is typically from 49 to 88° C. (U.S. Pat. No. 5,455,288). In the latter case, however, the pigment content is at an unsatisfactorily low level of from 5 to 50%. In both cases, collision forces are principally at work in the case of low shear forces, and the presence of more than 10% by weight of a substance of low melting point is disadvantageous from the performance standpoint.

Pigments can also be embedded in resins. This is done by first preparing a dispersion of the pigment in an inert solvent (for example water) and a solution of the resin in an appropriate solvent and then mixing the two, and precipitating the resin from the solution, either directly in the course of mixing or else later, the pigment being enveloped by the precipitating resin. innumerable publications have proposed, as the resin, almost all substances known to have a certain resinous character, including rosin. Various processes in accordance with this principle are known, for example acid/base precipitations (CS 216 590; IN 156 867; DE-A 33 27 562) and one- or two-phase solvent granulations (U.S. Pat. No. 4,055,439; U.S. Pat. No. 4,208,370). The not entirely satisfactory dispersibility of such resin-embedded pigments can be improved by the use of special resin mixtures coupled with a very high shear force (U.S. Pat. No. 4,116,924; U.S. Pat. No. 4,168,180). Nevertheless, the preparation of the pigment dispersion in any case requires intensive milling, especially when the inert solvent used is an aqueous medium, in which case the pigment, however, is comminuted in an undesirable manner. Instead of resins it is also possible to use surfactants (EP 403 917): in this case, although dispersion is made easier, the product is not obtained in a dust-free form but rather in a powder form.

In the case of the acid/base precipitations, the control of neutralization is a further problem which cannot be solved with complete satisfaction by the method described in DE 33 27 562. When precipitating with acid, in fact, the resin does not precipitate in a completely neutral form, which in many cases causes problems for high-grade applications, such as coating operations or the mass colouring of plastics. In the case of solvent granulations, on the other hand, large amounts of solvents are required which, disadvantageously, have to be recovered from usually aqueous mixtures. Therefore, the use of acetic or propionic anhydride as solvent has been proposed (EP 069 617), giving rise to aqueous solutions which can purportedly be used in the chemical industry but which, for lack of demand, have to be disposed of at considerable cost.

It is also known that colorants can be converted into a low-dust flowable form by spray-drying or in a fluidized bed (EP 039 841; EP 670 352). The additives used therein, however, are completely unusable in the case of pigments that are to be used in high-grade applications such as the mass colouring of plastics or automotive finishing operations. Moreover, in the case of spray-drying or in a fluidized bed it is hardly possible to prepare homogeneous granules having a particle size of more than a few 100 μm (cf. e.g. Chemie-Technik 2116, 72–78 (1992); Arch. Pharm. Chemi, Sci. Ed. 1978/6, 189–201). Furthermore, it is not possible to fluidize all powders in a fluidized bed (Powder Technology 57, 127–133 (1989)), so that it is in no way possible to make generalized use of this method.

An improved variant of fluidized bed granulation, especially for pigments, is also known (U.S. Pat. No. 4,264,552) where the particle size distribution of these granules is very broad and the great majority of the particles (about half by weight) are smaller than 500 μm. Furthermore, these granules still have an excessive propensity to produce dust. In Example 2 the use is disclosed of a mixture of 8.2% by weight of Staybelite Resin™ and 0.9% by weight of hydroxypropylcellulose (amounts based in each case on the finished product), in the form of its ammonium salts, as the anionic surfactant.

Water-soluble dyes can be processed with from 5 to 50% by weight of a water-soluble binder to form non-dusting cylindrical granules with a diameter of at least 1 mm (DE-A 2 317 175); according to the examples the granules have a diameter of about 1 mm and a length of 5–7 mm. By means of a conveying screw, the homogeneous plastic mass is pressed through a perforated disc (perforation diameter 1 mm).

However, water-soluble binders are completely unsuitable for pigments that are intended for use in customary plastics, and organic pigments treated by this process are highly agglomerated and have unsatisfactory dispersibility properties. They are therefore not sufficiently suitable for many applications. The same applies to the powder compression of water-moist pigments in a twin-screw extruder at pressures from 10 to 50 bar in accordance with the method known from Journal of Powder & Bulk Solids Technology 4/4, 27–32 (1980).

Also known are fine, low-dust colorant granules having a very low content of wax-like binder and other foreign substances (EP 424 896). Of essential importance is the use of a device in which the material fed in is exposed predominantly to severe turbulence and moderate collision forces coupled with declining shear stresses. This process is suitable, however, predominantly for inorganic pigments, and only one example of an organic pigment is disclosed: Example 13 uses the monoazo pigment Pigment Red 176, 0.72% by weight of a fatty acid mixture having a melting point of 57–61° C. as the wax, and 50–51% by weight of water (based in each case on the fine granules). The particle size is markedly less than 1 mm, and a sieving operation is necessary despite the relatively small proportions of coarse particles, which are difficult to disperse, and ultrafine particles, which produce dust.

Other known granules include those which exhibit a large increase in volume relative to the initial pigment as a result of the cavities which are retained on drying (EP 510 392). In this case shaping takes place exclusively by known methods; for extrusion to strands a residual moisture content of 50 to 80% by weight is specified. These granules are said to be readily dispersible and low in dust, but are brittle and have a low bulk density, with the result that they take up a substantially greater volume on transportation and storage. Furthermore, it is very difficult to obtain products having a precisely reproducible specific weight, and in the case of hydrophobic or apolar pigments this method produces unsatisfactory results.

Also known, finally, is a process in which hydrophilic pigments are transported as aqueous, paste-like agglomerates (U.S. Pat. No. 5,328,506). In contrast to extruded "noodles" it is not necessary to carry out high-energy dispersion of these products later on. However, the process is aimed not at organic pigments but at inorganic kaolin pigments, and the presence of water in the stated amount of 1 to 25% has an adverse effect on, or may even rule out totally, the use of organic pigments in the vast majority of fields.

Furthermore, as already mentioned, the coarsely particulate pigment preparations prepared by some of the known processes are still not, simultaneously, satisfactorily compact, dust-free and/or readily dispersibile. In addition, the desired particle size usually has to be selected by sieving, with particles having a size other than this desired particle size (especially the fine fraction) having to be passed back to the process. However, the recycling of the unsatisfactory pigment material causes an additional detrimental alteration to its physical parameters, and, consequently, a worsening in the performance properties as well.

The aim of the invention was to provide coarsely particulate, extremely dust-free, highly concentrated, readily dispersible and universally applicable organic pigment granules in which, apart from the external aspect, the physical parameters of the pigment particles are changed as little as possible relative to the initial pigment powder, unlike the known granules. The term physical parameters is understood as meaning not only the abovementioned properties but also all other technically measurable or applications-relevant properties. The intention is that these pigment granules should as far as possible be able to be prepared by means of simple and universally applicable methods, in simple, inexpensive and easy-to-clean apparatus, without the addition of organic solvents to be absolutely necessary and without the need to select the right particles and recycle the rejects.

DETAILED DESCRIPTION OF THE INVENTION

The aim of the invention has been achieved to a particularly surprising extent by means of the present invention.

The invention relates to a process for preparing organic pigment granules with a particle size from 0.5 to 4 mm, which consist of at least 90% by weight of at least one organic pigment with a particle size from 0.01 to 10 μm and from 0 to 10% by weight of a binder having from 2 to 7 mol of carboxyl groups per 1000 g and from 0 to 5% by weight of a neutral emulsifier which does not form ions and which dissolves to give a clear solution in water or a $C_1$–$C_4$alcohol at a concentration of at least 10 g/100 ml, the binder and the emulsifier together accounting for not more than 10% by weight and all percentages by weight being based on the overall amount of pigment granules, wherein

[1] the pigment is mixed with 54–92% by weight of water, a $C_1$–$C_4$alcohol, a $C_3$–$C_8$ketone or a mixture thereof, based on the dry pigment, with the binder and 0.8–20 mol of ammonia or a $C_1$–$C_3$amine, per mole of carboxyl groups in the binder, and with the emulsifier;

[2] this mixture is pressed in a continuously operating apparatus through one or more apertures each having a size of 0.2–5.0 mm$^2$, the apparatus consisting of at least one conveying device and a shaping section comprising the apertures, and being constructed, and operated with a throughput, such that the pressure in its shaping section does not exceed 10 bar;

[3] if desired, the cylindrical granules emerging from the dies are converted on a rotating device into ovoid or spherical granules, and

[4] the granulated product is dried at a temperature of −50 to 200° C. at atmospheric pressure or under reduced pressure.

The granules can have any desired geometric form; for example, they can be cylindrical, ovoid or spherical. The granules preferably have a non-angular, rounded geometric form. With particular preference the granules are essentially spherical, which can be achieved by the optional step [3]. If spherical, the granules generally have a particle size with a diameter from 0.5 to 4 mm. Cylindrical and ovoid granules generally have a diameter from 1 to 3 mm and a length from 1 to 10 mm.

The granules preferably have a particle size with a diameter from 1 to 4 mm. With particular preference the granules have a particle size with a diameter from 1 to 2.5 mm. If the granules are not spherical, they have a particle size with a theoretical diameter $$\left( \sqrt[3]{\frac{6 \times \text{volume}}{\pi}} \right)$$

from 1 to 2.5 mm.

Within the granules, the organic pigment and the binder preferably form an essentially homogeneous mixture.

The organic pigment can be an individual compound from any desired pigment class, or else a mixture of two or more compounds from the same or from different pigment classes, and can be present in any desired, known crystal modification, which is advantageously retained in the course of the process of the invention, or else can be a solid solution.

Examples of suitable pigment classes are the diketopyrrolopyrroles, quinacridones, perylenes, dioxazines, anthraquinones, indanthrones, flavanthrones, indigos, thioindigos, quinophthalones, isoindolinones, isoindolines, phthalocyanines, metal complexes and azo pigments.

Preferred pigments are diketopyrrolopyrroles, quinacridones, perylenes, dioxazines, indanthrones, flavanthrones, isoindolinones and phthalocyanines and also aminoanthraquinones and disazo condensation pigments. Particularly preferred pigments are diketopyrrolopyrroles, quinacridones and phthalocyanines. Very particularly preferred pigments are diketopyrrolopyrroles.

Preferred perylenes are of the formula (Ia), (Ib), (Ic) or (Id), (Ia)

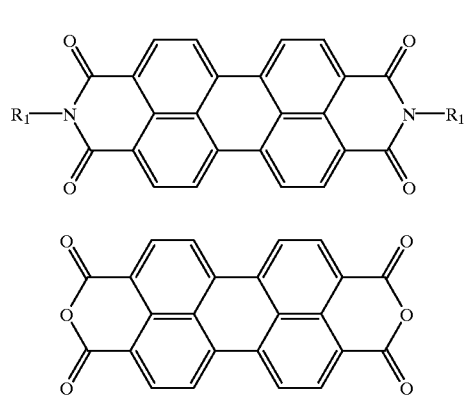

(Ib)

(Ic)

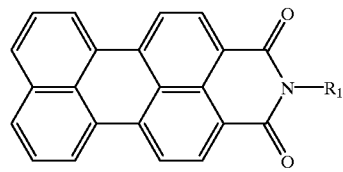

(Id)

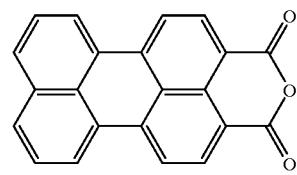

in which $R_1$ is hydrogen, $C_1$–$C_6$alkyl, phenyl or benzyl or is phenethyl which is unsubstituted or substituted by halogen, $C_1$–$C_4$alkyl or $C_1$–$C_4$alkoxy.

Preferred quinacridones are of the formula (II), (II)

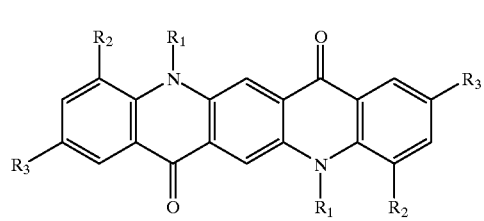

in which $R_1$ is hydrogen, $C_1$–$C_6$alkyl, phenyl or benzyl or is phenethyl which is unsubstituted or substituted by halogen, $C_1$–$C_4$alkyl or $C_1$–$C_4$alkoxy, and $R_2$ and $R_3$ independently of one another are hydrogen, halogen, $C_1$–$C_{18}$alkyl, $C_1$–$C_4$alkoxy or phenyl.

Preferred dioxazines are of the formula (III), (III)

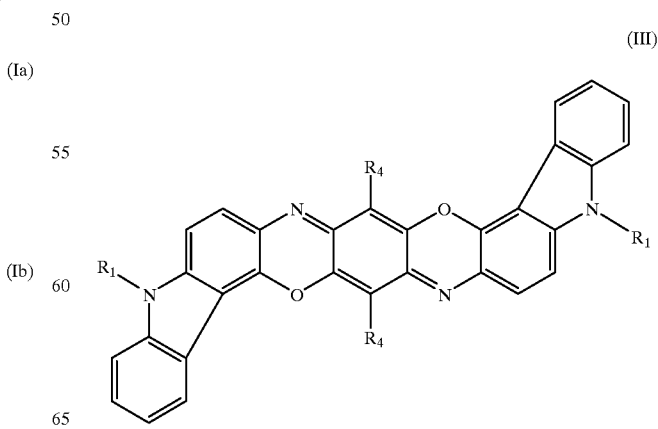

in which $R_1$ is hydrogen, $C_1$–$C_6$alkyl, phenyl or benzyl or is phenethyl which is unsubstituted or substituted by halogen, $C_1$–$C_4$alkyl or $C_1$–$C_4$alkoxy, and $R_4$ is hydrogen, halogen or $C_1$–$C_{18}$alkyl.

Preferred isoindolinones are of the formula (IVa) or (IVb),

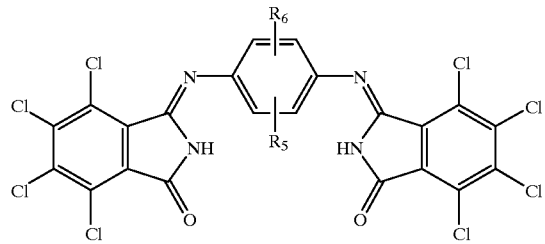
(IVa)

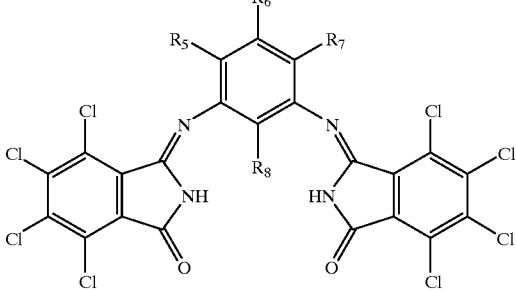
(IVb)

in which $R_5$, $R_6$, $R_7$ and $R_8$ independently of one another are hydrogen, $C_1$–$C_{18}$alkyl, $C_1$–$C_4$alkoxy, halogen or trifluoromethyl.

Preferred flavanthrones are of the formula (VI),

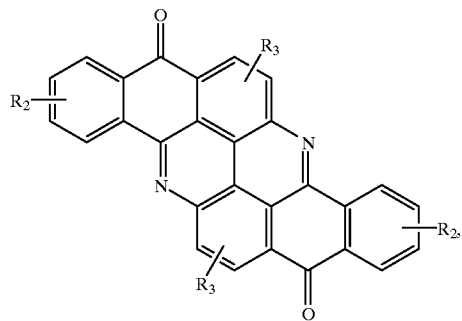
(V)

in which $R_2$ and $R_3$ independently of one another are hydrogen, halogen, $C_1$–$C_{18}$alkyl, $C_1$–$C_4$alkoxy or phenyl.

Preferred indanthrones are of the formula (VI),

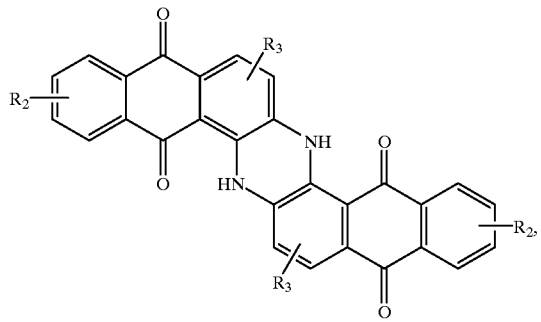
(VI)

in which $R_2$ and $R_3$ independently of one another are hydrogen, halogen, $C_1$–$C_{18}$alkyl, $C_1$–$C_4$alkoxy or phenyl.

Preferred phthalocyanines are of the formula (VII),

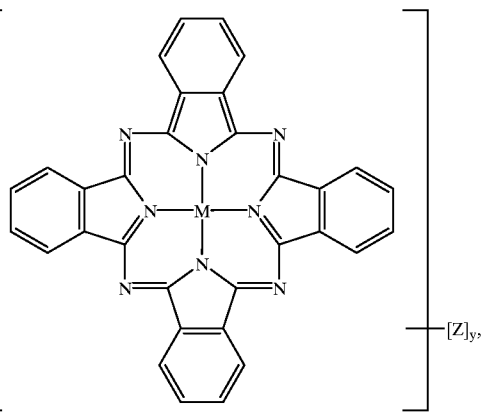
(VII)

in which M is $H_2$, Zn, Cu, Ni, Fe, Ti(=O) or V(=O),
Z is halogen and
y is 0 or an integer from 1 to 4.

Preferred pyrrolo(3,4-c)pyrroles are of the formula (VIII),

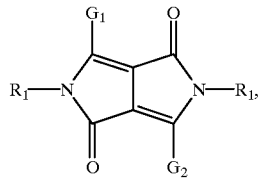
(VIII)

in which $R_1$ is hydrogen, $C_1$–$C_6$alkyl, phenyl or benzyl or is phenethyl which is unsubstituted or substituted by halogen, $C_1$–$C_4$alkyl or $C_1$–$C_4$alkoxy, and
$G_1$ and $G_2$ independently of one another are a group of the formula

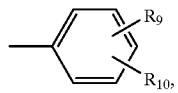 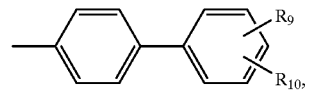

-continued

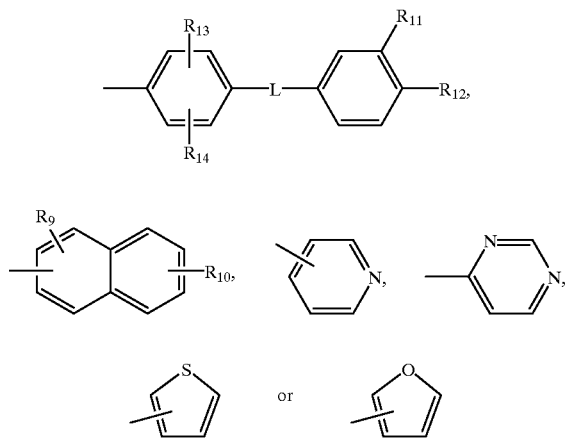

in which $R_9$ and $R_{10}$ independently of one another are hydrogen, halogen, $C_1$–$C_{18}$alkyl, $C_1$–$C_{18}$, $C_1$–$C_{18}$alkylthio, $C_1$–$C_{18}$alkylamino, $C_2$–$C_{18}$dialkylamino, —CN, —$NO_2$, phenyl, trifluoromethyl, $C_5$–$C_6$cycloalkyl, imidazolyl, pyrazolyl, triazolyl, piperazinyl, pyrrolyl, oxazolyl, benzoxazolyl, benzothiazlyl, benzimidazolyl, morpholinyl, piperidinyl, pyrrolidinyl, —C=N—($C_1$–$C_{18}$alkyl) or

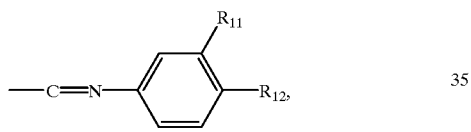

$R_{11}$ and $R_{12}$ independently of one another are hydrogen, halogen, $C_1$–$C_6$alkyl, $C_1$–$C_6$alkoxy or —CN, $R_{13}$ and $R_{14}$ independently of one another are hydrogen, halogen or $C_1$–$C_6$alkyl, L is —$CH_2$—, —CH($CH_3$)—, —C($CH_3$)$_2$—, —CH=N—, —N=N—, —O—, —S—, —SO—, —$SO_2$— or —$NO_{15}$— and $R_{15}$ is hydrogen or $C_1$–$C_6$alkyl.

The preferred aminoanthraquinone pigment is of the formula (IX)

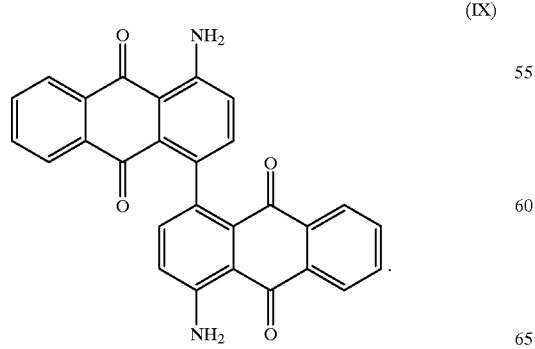

Preferred indigo derivatives are of the formula (X),

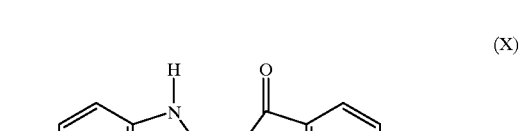

in which $R_{16}$ is hydrogen, CN, $C_1$–$C_4$alkyl, $C_1$–$C_4$alkoxy or halogen.

Preferred isoindolines are of the formula (XIa), (XIb) or (XIc),

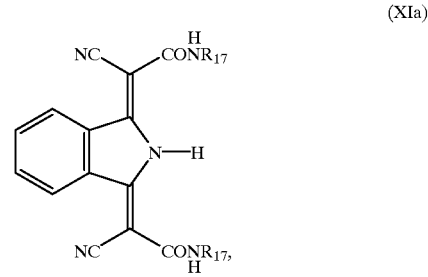

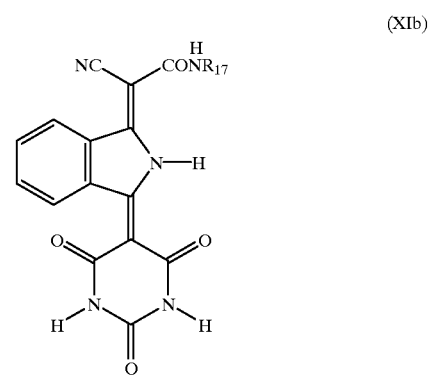

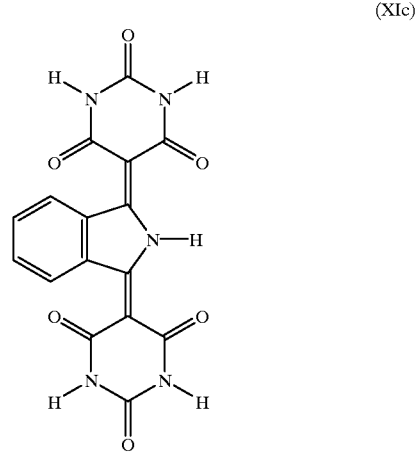

in which $R_{17}$ is hydrogen, $C_1$–$C_{18}$alkyl, benzyl or a group

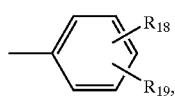

and
$R_{17}'$ is a group

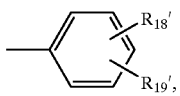

where $R_{18}$, $R_{19}$, $R_{17}'$ and $R_{18}'$ independently of one another are hydrogen, $C_1$–$C_{18}$alkyl, $C_1$–$C_4$alkoxy, halogen or trifluoromethyl.

Any halogen substituents are, for example, iodine, fluorine, especially bromine and preferably chlorine.

$C_1$–$C_4$Alkyl is, for example, methyl, ethyl, n-propyl, isopropyl, n-butyl, sec-butyl or tert-butyl, in the case of $C_1$–$C_6$alkyl additionally, for example, n-amyl, tert-amyl or hexyl, and in the case of $C_1$–$C_{18}$alkyl again additionally, for example, heptyl, octyl, 2-ethylhexyl, nonyl, decyl, dodecyl, tetradecyl, hexadecyl or octadecyl.

$C_5$–$C_6$Cycloalkyl is, for example, cyclopentyl and, in particular, cyclohexyl.

$C_1$–$C_4$Alkoxy is, for example, methoxy, ethoxy, n-propoxy, isopropoxy or butyloxy, and $C_1$–$C_{18}$alkoxy is in addition, for example, hexyloxy, decyloxy, dodecyloxy, hexadecyloxy or octadecyloxy.

$C_1$–$C_{18}$Alkylthio is, for example, methylthio, ethylthio, propylthio, butylthio, octylthio, decylthio, hexadecylthio or octadecylthio.

$C_1$–$C_{18}$Alkylamino is, for example, methylamino, ethylamino, propylamino, hexylamino, decylamino, hexadecylamino or octadecylamino.

$C_2$–$C_{18}$Dialkylamino is, for example, dimethylamino, diethylamino, methylpropylamino, ethylhexylamino, methyldecylamino, dioctylamino or ethylhexadecylamino, the carbon atoms of both alkyl radicals being counted together.

In the case of the perylenes of the formula (Ia) or (Ic), the quinacridones of the formula (II), the dioxazines of the formula (III) and the pyrrolo(3,4-c)pyrroles of the formula (VIII) particular preference is given to those in which $R_1$ is hydrogen.

Particularly preferred quinacridones of the formula (II) are those in which $R_1$ is hydrogen and $R_2$ and $R_3$ independently of one another are hydrogen, methyl, chlorine or methoxy.

Particularly preferred phthalocyanines of the formula (VII) are those in which M is $H_2$, Zn or Cu, and Z is chlorine or bromine.

Particularly preferred pyrrolo(3,4-c)pyrroles of the formula (VIII) are those in which $R_1$ is hydrogen and $G_1$ and $G_2$ independently of one another are each a group of the formula

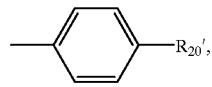

$R_{20}$ is fluorine, chlorine, cyano, nitro, trifluoromethyl, $C_1$–$C_4$alkyl, $C_c$–$C_4$alkoxy, $C_1$–$C_4$alkylamino or $C_1$–$C_4$dialkylamino, and, of these, especially those in which $R_{20}$ is chlorine. A preference quite out of the ordinary is given to 1,4diketo-3,6-di(4'-chlorophenyl)-2,5-dihydropyrrolo[3,4-c]pyrrole.

The organic pigment used in accordance With the invention has a particle size from 0.01 to 10 μm. This means that at least 90% by weight of the particles have this particle size. The organic pigment preferably has a mean particle size of from 0.2 to 2 μm. With particular preference the organic pigment has a narrow particle size distribution, in other words at least 80% by weight of the particles have a particle size which is within a range whose extent is not more than one power of ten, for example between 0.5 and 5 μm or between 0.2 and 2 μm. A narrow particle size distribution can be obtained by methods known to the skilled worker, for example by treatment in a polar inert liquid at elevated temperature. Appropriate liquids, temperatures and durations for this treatment, which may be very different depending on the pigment, are known for all pigment classes and for many individual pigments.

The binder has from 2 to 7 mol of carboxyl groups per 1000 g of substance. The binder generally contains 30–100% by weight, preferably at least 60% by weight, of at least one organic acid, it being possible for the remainder of the binder to be neutral. The organic acid can, for example, be a saturated or unsaturated, long-chain pure acid, or a mixture thereof, for example a homologue mixture. Long-chain acids are those in which there is at least one linear chain consisting of 8 C atoms. Preference is given to abietic acid and to acid mixtures comprising at least 5% by weight of abietic acid.

The neutral remainder of the binder may comprise, for example, substances which usually appear as impurities in the acids used. However, it is likewise possible to add relatively small amounts of a texture enhancer to the organic acid. The texture enhancer, if added, is a constituent of the binder; its amount is not more than 50% by weight, preferably not more than 10% by weight, based on the overall binder. The texture enhancer can, for example, be an amide or a metal salt of an organic acid having at least 18 C atoms, an alkylphenol or an aliphatic alcohol, or a plasticizer or a wax. Known texture enhancers are, for example, stearamide or behenamide, magnesium stearate or magnesium behenate, stearyl alcohol, aliphatic 1,2-dihydroxy compounds having 8 to 22 C atoms, such as 1,2-dodecanediol, dibutyl phthalate or beeswax.

The binder consists preferably of a mixture of naturally occurring acids having 8 to 30 carbon atoms and naturally occurring terpene derivatives, and can be obtained, for example, by extraction from naturally occurring woods. For example, this mixture can be resin or Staybelite Resin™ (Hercules Inc., Wilmington/Del./USA). The binder particularly preferably has a melting point of 70–300° C. and, with very particular preference, a melting point of 90–200° C.

The exact amount of the binder depends on what is required of the granules. If granules with very high mechanical loadability are required, then the amount of binder is preferably 5–10% by weight, particularly preferably 5–8% by weight. If, on the other hand, universal granules of very good compatibility in as wide as possible a range of applications (for example in coatings) are desired, then the amount of binder is preferably 0.5–2% by weight. Very particular preference is given to granules which contain less than 0.5% by weight of binder or which are even totally free from binder. Although in the latter case it is unclear how the pigment particles are held together within the granules, it has been found, very surprisingly, that even binder-free granules prepared in accordance with the invention have a highly remarkable mechanical stability.

The neutral non-ionic emulsifier can be, for example, a copolymer of ethylene oxide and propylene oxide, a fatty alcohol ethoxylate or an alkylphenol ethoxylate, for example an emulsifier of the Emulan® series (BASF). The amount of emulsifier is preferably 0.3–1% by weight.

Binder and emulsifier are independent of one another and both are optional. Depending on the desired granule properties it is possible to use, as desired, binder, emulsifier, both binder and emulsifier, or neither binder nor emulsifier. The binders and emulsifiers listed are used in the process according to the invention, if at all, in the stated concentrations, which begin at zero per cent by weight (corresponding to complete absence). The preferred overall amount of binder and emulsifier is preferably 0.3–5% by weight.

The $C_1$–$C_8$alcohol may be if desired, for example, methanol, ethanol, n-propanol, isopropanol or a butanol, and can be used in pure form or, in particular, as aqueous mixtures. Preference is given to $C_1$–$C_4$alcohols, especially methanol, ethanol or isopropanol; methanol is particularly preferred.

The $C_3$–$C_8$ketone may be if desired, for example, acetone, ethyl methyl ketone, methyl propyl ketone or cyclohexanone, and can be used in pure form or, in particular, as aqueous mixtures. Preference is given to $C_3$–$C_6$ketones, especially acetone or ethyl methyl ketone; ethyl methyl ketone is particularly preferred.

However, it is generally very particularly preferred to use in stage [1] from 90 to 100% by weight of water, based on the overall amount of water, $C_1$–$C_8$alcohol and $C_3$–$C_8$ketone, it being possible to use, in particular, water alone, which can for example be of a defined quality, for example deionized water. As an exception, highly polar pigments such as pigments having at least one primary amino group, for example the aminoanthraquinone of formula (IX), are preferably granulated at a lower concentration of water, particularly preferred at from 30 to 60% by weight of water, based on the overall amount of water, $C_1$–$C_8$alcohol and $C_3$–$C_8$ketone.

If a mixture of water, a $C_1$–$C_8$alcohol and/or a $C_3$–$C_8$ketone is used, it is preferably an azeotropic mixture. This makes it possible to reuse the mixture easily in an advantageous manner.

The $C_1$–$C_3$amine may, if desired, be methylamine, dimethylamine, ethylamine, trimethylamine, ethylmethylamine, n-propylamine or isopropylamine. Preference is given to $C_1$–$C_3$amines having a very low boiling point, and particular preference to methylamine. With very particular preference, however, ammonia rather than a $C_1$–$C_3$amine is used in stage [1]. Ammonia is understood as meaning gaseous ammonia; instead it is of course also possible to use liquid ammonia—in this case, however, the water of the liquid ammonia also counts as added water. The preferred amount of ammonia or $C_1$–$C_3$amine is about 1 mol per mole of carboxyl groups in the binder, so that the binder is just completely neutralized.

The mixing of the pigment with the water and/or $C_1$–$C_8$alcohol and/or with the $C_3$–$C_8$ketone, the emulsifier, the binder and the ammonia or $C_1$–$C_3$amine can be effected in any known manner, for example in a mixing apparatus. Useful mixing apparatus is that in which the pigment is subjected to a maximum pressure which is lower than the maximum pressure arising in stage [2] of the process. The skilled worker is aware of numerous mixers imposing little mechanical stress, for example those described in Perry's Chemical Engineer's Handbook ($6^{th}$ Ed., McGraw-Hill Book Company). Commercially available annular bed mixers are preferred.

The pigment can be employed in dry form or else in the form of moist product, for example a moist filter cake; in the latter case, the water or $C_1$–$C_8$alcohol or $C_3$–$C_8$ketone present in the moist product also counts as added water or alcohol or ketone. If the moist product is sufficiently moist it may be possible to do entirely without additional moistening media. For example, a pigment filter cake with 47.9% residual moisture corresponds to the addition of 91.9% by weight, and one with 35.1% residual moisture to the addition of 54.1% by weight, of water to the dry pigment. Preferably, however, a dry pigment of known specifications is employed. The binder can be employed dry or in the form of a solution of the ammonium salt. In the latter case, for example, the binder is stirred beforehand together with ammonia or a $C_1$–$C_3$amine in water, $C_1$–$C_8$alcohol, $C_3$–$C_8$ketone or a mixture thereof, at room temperature or at a temperature which is between room temperature and the melting point of the binder, under atmospheric or superatmospheric pressure, until a solution is formed. Binder solutions are preferably prepared at room temperature.

The form and sequence in which the ingredients are mixed in is essentially unimportant. What is important, however, is that the mixture is substantially homogeneous after mixing. It is therefore preferred to employ the binder in the form of a solution of the ammonium salt, in which case all of the water or $C_1$–$C_4$alcohol, or just part of it, can be used to prepare this solution.

It is particularly preferred to meter in the dry pigment continuously at the entrance of the mixer while at the same time spraying on an ammoniacal aqueous solution of the binder in the required amount. This process lends itself particularly well to full automation by methods known per se. The mixed product can be processed further immediately or later in stage [2] of the process, it being preferred to follow stage [1] directly by stage [2].

Pressing takes place mechanically in a continuously operating apparatus which consists at least of a conveying device and a shaping section with apertures. The conveying device is not subject to any particular requirements, other than that the mixture to be pressed should not be subjected therein to any pressure exceeding 10 bar. Conventional conveying devices can be used, for example one or more rotating screws. A twin screw is the preferred conveying device.

The apertures through which the mixture is pressed can in principle have any desired cross-section. Apertures with a non-angular cross-section are preferred. By this are meant rounded, for example elliptical or, preferably, circular apertures which have no angles. The apertures preferably measure from 0.5 to 2.5 mm in the shortest axis. The apertures can, for example, be punched out or burnt with a laser beam. while the circular apertures can in addition, and preferably, be drilled. It is preferred to have a large number of apertures made at regular intervals. The preferred diameter of circular apertures is dependent on the binder and at 0–3% by weight of binder is from 0.5 to 1.5 mm, at 3–10% by weight of binder, on the other hand, from 1.0 to 2.5 mm.

The shaping section with the apertures has any desired form which is neither planar nor cylindrical. If use is made in fact of a planar sieve arranged at right angles to the conveying device, then the pressure generally exceeds the maximum pressure which is critical to the invention, and the granules do not have the advantages of the invention. It is therefore critical for the shaping section with the apertures to have a three-dimensional curvature, for example a hollow truncated cone or a hollow dome. On the other hand, the material to be shaped is often pressed in a highly irregular manner if the sieve is a hollow cylinder, and in this case increases in pressure, possibly exceeding the maximum pressure which is critical to the invention, occur readily for short periods, and at least some of the material likewise lacks the advantages of the invention. The shaping section is preferably hemispherical.

The preferred apparatus constructed in accordance with the features of the invention comprises radial extruders and, with particular preference, dome extruders, which are obtainable commercially in numerous designs. Since the build-up of pressure is a function of the rotational speed of the conveying screw, the apparatus should be operated at a lower rotational speed than the maximum speed, corresponding to a reduced throughput, where this appears necessary on the basis of the desired maximum pressure.

In a radial extruder the pressure increases in the direction of the cone apex. In this case it may be that the pressure at the apex of the shaping section threatens to exceed 10 bar. In general, therefore, the apex of the shaping section should have an additional aperture, which should be designed or set such that the desired pressure is not exceeded. The small amount of material emerging from this additional regulatable aperture can in fact be recycled but only if it has been exposed to a maximum pressure of not more than 10 bar.

Recycling, however, is generally not advisable. This problem does not arise in the case of the dome extruder, which is particularly preferred.

The pressure in the shaping section is preferably from 1 to 5 bar, particularly preferably from 1.1 to 3 bar. The cylindrical extrudate generally breaks up of its own accord on emergence from the shaping section into pieces with a length of about 2 to 6 mm, which judiciously should not be allowed to stand for any length of time. The cylindrical granules are preferably processed further directly.

The rotating device which converts the cylindrical granules into spherical granules can be, for example, a plate, a hollow cylinder or the like. The cylindrical material emerging from the extruder is preferably passed directly onto roughly the centre of the rotating device, centrifugal force setting the cylindrical granules into a rolling movement and so converting them into more or less spherical granules.

Conversion into ovoid or spherical granules is optional. However, it has been found that the performance advantages of the invention are greater if the granules are ovoid or spherical. Preferably, therefore, this optional stage is implemented.

The granulated product is dried in known manner at the stated temperature and under the state d pressure. Drying can be operated batchwise or continuously, in the latter case the material to be dried being conveyed, for example on a conveyor belt, through an oven which is open at both ends and is at a temperature of 100–200° C. In the course of drying both the water or the $C_1$–$C_4$alcohol and, if present, the ammonia or the $C_1$–$C_3$amine are released, and are stripped off if necessary. The vapours are preferably taken off under suction and condensed, with the condensates being recycled. Instead of drying in an oven, however, it is also possible to use any other drying method, for example freeze-drying.

The whole of the process of the invention is preferably operated continuously.

The pigment granules prepared in accordance with the invention are coarse and highly concentrated, extremely dust-free and readily dispersibile. The physical parameters of the pigment particles present within the pigment granules are hardly changed relative to those of the pigment particles in the initial pigment powder. In general, therefore, organic pigment present in the pigment granules likewise has a particle size of from 0.01 to 10 $\mu$m. The organic pigment enclosed in the pigment granules preferably has a narrow particle size distribution. Further preferred pigment granules include those obtained by the abovementioned preferred embodiments of the process of the invention.

The invention therefore also relates to pigment granules with a particle size from 0.5 to 4 mm which consist of at least 90% by weight of at least one organic pigment and from 0 to 10% by weight of a binder having from 2 to 7 mol of carboxyl groups per 1000 g and from 0 to 5% by weight of a neutral emulsifier which does not form ions and which dissolves to give a clear solution in water or a $C_1$–$C_4$alcohol at a concentration of at least 10 g/100 ml, the binder and the emulsifier together accounting for not more than 10% by weight and all percentages by weight being based on the overall amount of pigment granules, wherein the pigment present in the pigment granules essentially has a particle size of from 0.01 to 10 $\mu$m.

To determine the particle size of the pigment present therein, the granules can be treated with ultrasound in a liquid which wets but does not dissolve the pigment, but which may dissolve or break up the other components of the granules, so as to give a homogeneous dispersion of the pigment. The particle size distribution of the dispersed pigment can then be determined, for example, by disc centrifuging. A suitable apparatus for this, for example, is the Joyce-Loebl disc centrifuge DCF 4. The requirements regarding sample preparation and the determination of the particle size distribution are very well known to the skilled worker in the field of particle measurement. The techniques are also described comprehensively in relevant textbooks [cf. e.g. Terence Allen, Particle Size Measurement, !, (Chapman and Hall, London, New York 1981)].

On account of the properties highlighted above, the pigment granules of the invention are especially suitable, in an effective amount for colouring, for pigmenting high molecular mass organic material, especially plastics and coatings.

The high molecular mass organic material for whose pigmenting the pigment granules of the invention can be used can be of natural or synthetic origin. High molecular mass organic materials usually have molecular weights from about $10^3$ to $10^7$ g/mol or more. They may be, for example, natural resins, drying oils, rubber or casein or natural substances modified from these, such as chlorinated rubber, oil-modified alkyd resins, viscose, cellulose ethers or esters, such as ethylcellulose, cellulose acetate, cellulose propionate, cellulose acetobutyrate or nitrocellulose, but especially fully synthetic organic polymers (thermosets and thermoplastics) as are obtained by addition polymerization, condensation polymerization or polyaddition. From the class of the addition polymerization resins mention may be made primarily of polyolefins, such as polyethylene, polypropylene or polyisobutylene, and substituted polyolefins, such as polymers of vinyl chloride, vinyl alcohol, vinyl acetate, butyl acetate, styrene, acrylonitrile, acrylic or methacrylic acid, acrylic or methacrylic esters or butadiene, and also copolymers of the monomers mentioned, especially ABS or EVA.

From the series of the polyaddition resins and condensation polymerization resins mention may be made of the condensates of formaldehyde with phenols, known as phenolic resins, and the condensates of formaldehyde with urea, thiourea and melamine, known as aminoresins, the polyesters which are used as paint resins, and indeed both saturated resins, for example alkyd resins, and unsaturated resins, for example maleate resins, and also the linear polyesters and polyamides, polyurethanes or silicones.

The high molecular mass compounds mentioned can be present individually or in mixtures, as plastic masses or melts. They can also be in the form of their monomers or in the polymerized state in dissolved form as film formers or binders for coating materials or printing inks, for example linseed oil varnish, nitrocellulose, alkyd resins, melamine resins and urea-formaldehyde resins or acrylic resins.

The pigment granules of the invention can be added in any amount effective for colouring to the high molecular mass organic material that is to be pigmented. A pigmented composition judiciously contains 0.1–30% by weight, preferably 1–20% by weight, of pigment granules according to the invention, based on the high molecular mass organic material that is to be pigmented.

For pigmenting organic materials the pigment granules of the invention can be used individually. It is likewise possible, however, in order to obtain different shades or colour effects, to add other colouring constituents, such as white, coloured, black or special-effect pigments, in any desired amounts to the organic substances in addition to the pigment granules of the invention.

The pigmenting of the high molecular mass organic substances with the pigment granules of the invention takes place, for example, by mixing such pigment granules into these substrates using roll mills, mixers or milling apparatus. The pigmented material is subsequently brought into the desired end form by techniques known per se such as calendering, compression moulding, extrusion, spreading, casting or injection moulding. All additives customary in the plastics industry, for example plasticizers, fillers or stabilizers, can be incorporated into the polymers in customary amounts before or after the incorporation of the pigment. In order to produce non-rigid mouldings or to reduce their brittleness it is particularly desirable to incorporate plasticizers, for examples esters of phosphoric, phthalic or sebacic acid, into the high molecular mass compounds before they are shaped.

For pigmenting coating materials and printing inks the high molecular mass organic materials and the pigment granules of the invention, alone or together with customary additives, for example fillers, other pigments, siccatives or plasticizers, are finely dispersed or dissolved in an organic solvent or solvent mixture suitable for all of them. A possible procedure here is to disperse or dissolve the individual components alone, or else two or more of them together, and only then to combine all of the components, The colourings obtained, for example in plastics, coating materials or printing inks, preferably in coating materials or printing inks and, with particular preference, in coating materials, are notable for excellent properties which are at least equal to those of the powder pigments and in many cases indeed are superior.

Where the high molecular mass material to be pigmented is a coating material, it is in particular a speciality coating material, with very particular preference an automotive coating material.

The examples which follow illustrate the invention (in the examples the parts and percentages are in each case by weight):

EXAMPLE 1

260 kg of 3,6-di-(4'-chlorophenyl)-2,5-dihydropyrrolo[3,4-c]pyrrole-1,4-dione meeting pigment-grade specification are pasted up homogeneously with 189 kg of deionized water in a conventional annular bed mixer (K-TT™, Drais AG, Mannheim/Germany) to give a formable mass having a solids content of 58%. This moist mass is extruded through a hemispherical shaping section having perforations of 1 mm in diameter in a radial extruder (DG-L1™, Fitzpatrick Co. Europe NV, St.-Niklaas/Belgium) at a conveying speed of 40–50 rpm with a throughput of about 120 kg/h. The cylindrical extrudate particles are then shaped to spheroids in a rounding stage on a granulating plate, and these spheroids are dried in a convection oven at 120° C. to a residual moisture content of <1%. Granules are obtained which are markedly lower in dust than the pigment employed yet while having similar ease of dispersibility. Incorporated by conventional methods in an alkyd/melamine varnish or in flexible PVC, these granules give colouratings which are essentially similar to those provided by the pulverusent pigment.

EXAMPLE 2A

The procedure of Example 1 is repeated but using as raw material a mixture, obtainable in analogy to IN-156'867 and U.S. Pat. No. 4,264,552, comprising 90% C.I. Pigment Red 177 [65300] and 10% Staybelite Resin™. 300 parts of this dry mixture are formed into a paste with 200 parts of deionized water (i.e. 74.1% based on the pigment) and 9 parts of trimethylamine in an annular bed mixer, and this paste is extruded to filaments of 0.70 mm in diameter in a radial extruder at a low extrusion pressure. The extruded particles are rounded to give spheroids of about 1 mm which are dried in a vacuum oven at 100° C. under reduced pressure. The resulting granules have very good properties.

EXAMPLE 2B

The procedure of Example 2A is repeated except that filaments of 1.2 mm in diameter are extruded. The extruded particles are rounded to spheroids of about 2 mm. The resulting granules have very good properties.

EXAMPLE 2C

The procedure of Example 2B is repeated except that non-ionic process water (24° dh [German hardness]) is used. The resulting granules have very good properties.

EXAMPLE 3A

The procedure of Example 1 is repeated but using as raw material pure C.I. Pigment Red 220 [20055]. 310 parts of this dry pigment are formed into a paste with 190 parts of deionized water in an annular bed mixer, and this paste is extruded in a radial extruder at low extrusion pressure. The extruded particles are rounded into spheroids and dried in a vacuum oven at 110° C. under reduced pressure. The resulting granules have very good properties.

EXAMPLE 3B

The procedure of Example 3A is repeated, except that 190 parts of dry pigment are formed into a paste with 143 parts of a 7% strength solution of Emulan OSN™ (BASF, Leverkusen/Germany) in deionized water in an annular bed mixer. The resulting granules have very good properties.

EXAMPLE 3C

The procedure of Example 3A is repeated, except that 195 parts of dry pigment are formed into a paste with 14 parts of a 7% strength solution of Emulan OSN™ in deionized water and 126 parts of deionized water in an annular bed mixer. The resulting granules have very good properties.

EXAMPLE 4A

The procedure of Example 1 is repeated but using as raw material pure C.I. Pigment Yellow 93 [20710]. 300 parts of this dry pigment are formed into a paste with 200 parts of deionized water in an annular bed mixer, and this paste is extruded in a radial extruder at low extrusion pressure. The extruded particles are rounded into spheroids and dried in a vacuum oven at 100° C. under reduced pressure. The resulting granules have very good properties.

EXAMPLE 4B

The procedure of Example 4A is repeated, except that 190 parts of dry pigment are formed into a paste with 143 parts of the 7% strength solution of Emulan OSN™ in an annular bed mixer. The resulting granules have very good properties.

EXAMPLE 4C

The procedure of Example 4A is repeated, except that 195 parts of dry pigment are formed into a paste with 14 parts of a 7% strength solution of Emulan OSN™ (BASF, Leverkusen/Germany) in deionized water and 126 parts of deionized water in an annular bed mixer. The resulting granules have very good properties.

EXAMPLE 5A

The procedure of Example 1 is repeated but using as raw material pure C.I. Pigment Orange 64 [12760]. 300 parts of this dry pigment are formed into a paste with 200 parts of deionized water in an annular bed mixer, and this paste is extruded in a radial extruder at low extrusion pressure. The extruded particles are rounded into spheroids and dried in a vacuum oven at 100° C. under reduced pressure. The resulting granules have very good properties.

EXAMPLE 5B

The procedure of Example 5A is repeated, except that 195 parts of dry pigment are formed into a paste with 71 parts of a 7% strength solution of Emulan OSN™ (BASF, Leverkusen/Germany) in deionized water and 64 parts of deionized water in an annular bed mixer. The resulting granules have very good properties.

EXAMPLE 5C

The procedure of Example 5B is repeated except that, during shaping in the annular bed mixer, 26 parts of a solution consisting of 5 parts of Staybelite Resins, 6 parts of 25% aqueous ammonia solution and 15 parts of deionized water are added as well. The resulting granules have very good properties.

EXAMPLE 6A

The procedure of Example 1 is repeated but using as raw material pure C.I. Pigment Red 144 [20735]. 260 parts of this dry pigment are formed into a paste with 240 parts of deionized water in an annular bed mixer, and this paste is extruded in a radial extruder at low extrusion pressure. The extruded particles are rounded into spheroids and dried in a vacuum oven at 100° C. under reduced pressure. The resulting granules have very good properties.

EXAMPLE 6B

The procedure of Example 6A is repeated except that the pigment is used in the form of a water-containing press cake comprising 44.7% residual moisture. 372 parts of this moist press cake are formed into a paste with 24 parts of deionized water in an annular bed mixer, and the paste is extruded in a radial extruder at a low extrusion pressure. The resulting granules have very good properties.

EXAMPLE 7A

The procedure of Example 1 is repeated but using as raw material CINQUASIA Magenta B RT-343-D™ (C.I. Pigment Red 202 [73907], Ciba-Geigy AG, Basle/Switzerland). 200 parts of this dry pigment are formed into a paste with 165 parts of deionized water in an annular bed mixer, and this paste is extruded in a radial extruder at low extrusion pressure. The extruded particles are rounded into spheroids and dried in a vacuum oven at 100° C. under reduced pressure. The resulting granules have very good properties.

EXAMPLE 7B

The procedure of Example 7A is repeated except that 532 parts of dry pigment are formed into a paste with 318 parts of a solution consisting of 29 parts of Staybelite Resin™, 198 parts of 25% strength aqueous ammonia solution and 91 parts of deionized water in an annular bed mixer. The resulting granules have very good properties.

EXAMPLE 7C

The procedure of Example 7B is repeated, except that Staybelite Resin™ is used not in the form of a solution but as a fine powder and is charged directly to the annular bed mixer at the same time as the pigment, the aqueous ammonia solution and the water. The resulting granules have very good properties.

EXAMPLE 8A

The procedure of Example 1 is repeated but using as raw material CINQUASIA Magenta RT-243-D™ (C.I. Pigment Red 202 [73907], Ciba-Geigy AG, Basle/Switzerland). 345 parts of this dry pigment are formed into a paste with 129 parts of deionized water in an annular bed mixer, and this paste is extruded in a radial extruder at low extrusion pressure. The extruded particles are rounded into spheroids and dried in a vacuum oven at 100° C. under reduced pressure. The resulting granules have very good properties.

EXAMPLE 8B

The procedure of Example 8A is repeated except that 570 parts of dry pigment are formed into a paste with 251 parts of a solution consisting of 30 parts of Staybelite Resin™, 205 parts of 25% strength aqueous ammonia solution and 16 parts of deionized water in an annular bed mixer. The resulting granules have very good properties.

EXAMPLE 8C

The procedure of Example 8A is repeated except that 570 parts of dry pigment are formed into a paste with 205 parts of a solution consisting of 30 parts of Staybelite Resin™, 21 parts of 25% strength aqueous ammonia solution and 154 parts of deionized water in an annular bed mixer. The resulting granules have very good properties.

EXAMPLE 9A

The procedure of Example 1 is repeated but using as raw material CINQUASIA Violet R RT-101-D™ (C.I. Pigment Violet 19 [73900], Ciba-Geigy AG, Basle/Switzerland). 335 parts of this dry pigment are formed into a paste with 295 parts of deionized water in an annular bed mixer, and this paste is extruded in a radial extruder at low extrusion pressure. The extruded particles are rounded into spheroids and dried in a vacuum oven at 100° C. under reduced pressure. The resulting granules have very good properties.

EXAMPLE 9B

The procedure of Example 9A is repeated except that 594 parts of dry pigment are formed into a paste with 560 parts of a solution consisting of 6 parts of Staybelite Resin™, 41 parts of 25% strength aqueous ammonia solution and 513 parts of deionized water in an annular bed mixer. The resulting granules have very good properties.

EXAMPLE 9C

The procedure of Example 9A is repeated except that 594 parts of dry pigment are formed into a paste with 550 parts of a solution consisting of 6 parts of Staybelite Resin™, 3 parts of 25% strength aqueous ammonia solution and 541 parts of deionized water in an annular bed mixer. The resulting granules have very good properties.

What is claimed is:

1. A process for preparing organic pigment granules with a particle size from 0.5 to 4 mm, which consist of at least 90% by weight of at least one organic pigment with a particle size from 0.01 to 10 µm and from 0 to 10% by weight of a binder having from 2 to 7 mol of carboxyl groups per 1000 g and from 0 to 5% by weight of a neutral emulsifier which does not form ions and which dissolves to give a clear solution in water or a $C_1$–$C_4$alcohol at a concentration of at least 10 g/l 00 ml, the binder and the emulsifier together accounting for not more than 10% by weight and all percentages by weight being based on the overall amount of pigment granules, wherein

[1] the pigment is mixed with 54–92% by weight of water, a $C_1$–$C_4$alcohol, a $C_3$–$C_8$ketone or a mixture thereof, based on the dry pigment, with the binder and 0.8–20 mol of ammonia or a $C_1$–$C_3$amine, per mole of carboxyl groups in the binder, and with the emulsifier;

[2] this mixture is pressed in a continuously operating apparatus through one or more apertures each having a size of 0.2–5.0 mm², the apparatus consisting of at least one conveying device and a shaping section comprising the apertures, and being constructed, and operated with a throughput, such that the pressure in its shaping section does not exceed 10 bar;

[3] if desired, the cylindrical granules emerging from the dies are converted on a rotating device into ovoid or spherical granules, and

[4] the granulated product is dried at a temperature of –50 to 200° C. at atmospheric pressure or under reduced pressure.

2. A process according to claim 1, in which the granules are essentially spherical and have a particle size with a diameter from 0.5 to 4 mm.

3. A process according to claim 1, in which the pigment is a diketopyrrolopyrrole, quinacridone or phthalocyanine pigment.

4. A process according to claim 3 which the pigment is a diketopyrrolopyrrole of the formula (VIII)

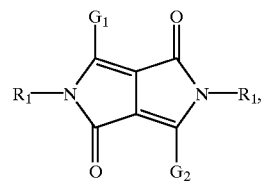

(VIII)

in which $R_1$ is hydrogen, $C_1$–$C_6$alkyl, phenyl or benzyl or is phenethyl which is unsubstituted or substituted by halogen, $C_1$–$C_4$alkyl or $C_1$–$C_4$alkoxy, and $G_1$ and $G_2$ independently of one another are a group of the formula

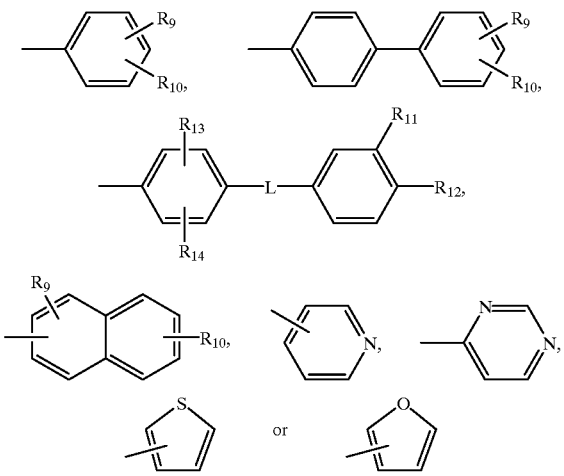

in which $R_9$ and $R_{10}$ independently of one another are hydrogen, halogen, $C_1$–$C_{18}$alkyl, $C_1$–$C_{18}$alkoxy, $C_1$–$C_{18}$alkylthio, $C_1$–$C_{18}$alkylamino, $C_2$–$C_{18}$dialkylamino, —CN, —NO$_2$, phenyl, trifluoromethyl, $C_5$–$C_6$cycloalkyl, imidazolyl, pyrazolyl, triazolyl, piperazinyl, pyrrolyl, oxazolyl, benzoxazolyl, benzothiazolyl, benzimidazolyl, morpholinyl, piperidinyl, pyrrolidinyl, —C=N—($C_1$–$C_{18}$alkyl) or

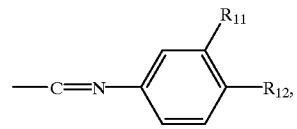

$R_{11}$ and $R_{12}$ independently of one another are hydrogen, halogen, $C_1$–$C_6$alkyl, $C_1$–$C_6$alkoxy or —CN, $R_{13}$ and $R_{14}$ independently of one another are hydrogen, halogen or $C_1$–$C_6$alkyl, L is —CH$_2$—, —CH(CH$_3$)—, —C(CH$_3$)$_2$—, —CH=N—, —N=N—, —O—, —S—, —SO—, —SO$_2$— or —NR$_{15}$— and $R_{15}$ is hydrogen or $C_1$–$C_6$alkyl.

5. A process according to claim 1, in which the pigment has a mean particle size from 0.2 to 2 µm.

6. A process according to claim 1, in which the binder contains at least 60% by weight of at least one organic acid.

7. A process according to claim 6, in which the binder contains at least 5% by weight of abietic acid.

8. A process according to claim 6, in which the amount of the binder is 5–8% by weight.

9. A process according to claim 6, in which the amount of the binder is 0.5–2% by weight.

10. A process according to claim 1, in which ammonia is used.

11. A process according to claim 1, in which in stage [1] from 90 to 100% by weight of water is used, based on the overall amount of water, $C_1$–$C_8$ alcohol and $C_3$–$C_8$ ketone.

12. A process according to claim 1, in which the pigment has at least one primary amino group and in stage [1] from 30 to 60% by weight of water is used, based on the overall amount of water, $C_1$–$C_8$ alcohol and $C_3$–$C_8$ ketone.

13. A method of pigmenting high molecular mass organic material, in which an amount effective for colouring of pigment granules prepared by the process of claim 1 is used.

14. A method according to claim 13, in which the pigment granules are used in an amount of 0.1–30% by weight, based on the high molecular mass organic material that is to be pigmented.

15. A process according to claim 1, wherein said apparatus used in step 2 is a radial extruder.

16. A process according to claim 1, wherein said apparatus used in step 2 is a dome extruder.

17. A process according to claim 1, wherein said shaping section in step 2 is neither planar nor cylindrical.

18. A process according to claim 1, wherein said shaping section in step 2 is a hollow truncated cone.

19. A process according to claim 15, wherein said shaping section in step 2 is a hollow truncated cone.

20. A process according to claim 1, wherein said shaping section in step 2 is hemispherical.

21. A process according to claim 16, wherein said shaping section in step 2 is hemispherical.

22. A process according to claim 1, characterized in that the granules contain less than 33⅓% by volume of voids.

23. A process according to claim 1, in which the pigment is a diketopyrrolpyrrole, quinacridone, perylene, dioxazine, indanthrone, flavanthrone, isoindolinone, phthalocyanine, aminoanthraquinone or disazo condensation pigment.

* * * * *